(12) United States Patent
Iwamoto

(10) Patent No.: US 10,194,082 B2
(45) Date of Patent: Jan. 29, 2019

(54) IMAGE PICKUP APPARATUS THAT SHOOTS MOVING IMAGE FOR PREDETERMINED TIME PERIOD AT THE TIME OF SHOOTING STILL IMAGE, CONTROL METHOD FOR THE IMAGE PICKUP APPARATUS, AND STORAGE MEDIUM

(71) Applicant: CANON KABUSHIKI KAISHA, Tokyo (JP)

(72) Inventor: Yasuhiko Iwamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/659,032

(22) Filed: Jul. 25, 2017

(65) Prior Publication Data
US 2017/0324904 A1 Nov. 9, 2017

Related U.S. Application Data

(63) Continuation of application No. 15/177,935, filed on Jun. 9, 2016, now Pat. No. 9,762,798.

(30) Foreign Application Priority Data

Jun. 12, 2015 (JP) ................................. 2015-119066

(51) Int. Cl.
*H04N 5/232* (2006.01)
(52) U.S. Cl.
CPC ............................. *H04N 5/23245* (2013.01)

(58) Field of Classification Search
CPC .... H04N 1/21–1/2195; H04N 1/2112–1/2154; G03B 2206/002
See application file for complete search history.

(56) References Cited

U.S. PATENT DOCUMENTS

| 7,697,036 B2 * | 4/2010 | Omata | G11B 27/034 348/220.1 |
| 7,756,349 B2 * | 7/2010 | Izawa | H04N 19/15 382/239 |
| 7,999,859 B2 * | 8/2011 | Okada | H04N 1/2112 348/231.2 |
| 2014/0348226 A1 * | 11/2014 | Kurashige | H04N 19/86 375/240.03 |
| 2016/0156926 A1 * | 6/2016 | Hashimoto | H04N 19/61 375/240.16 |

FOREIGN PATENT DOCUMENTS

JP 2001-078137 A 3/2001

* cited by examiner

*Primary Examiner* — Mekonnen D Dagnew
(74) *Attorney, Agent, or Firm* — Carter, DeLuca Farrell & Schmidt, LLP

(57) ABSTRACT

An image pickup apparatus which is capable of shooting a plurality of still images as instructed within a predetermined time period without a plurality of moving image encoders and a large-capacity memory. When a second still image shooting instruction has been received within a predetermined time period since a first still image shooting instruction was received, a moving image picked up before lapse of the predetermined time period after the second still image shooting instruction from a moving image shooting starting timing corresponding to the first still image shooting instruction is recorded as a sequence of moving images.

8 Claims, 8 Drawing Sheets

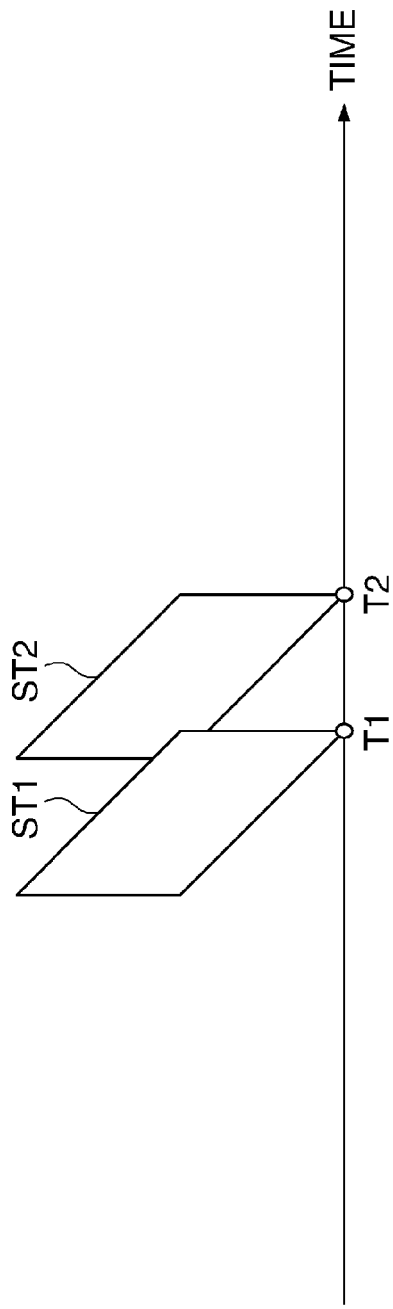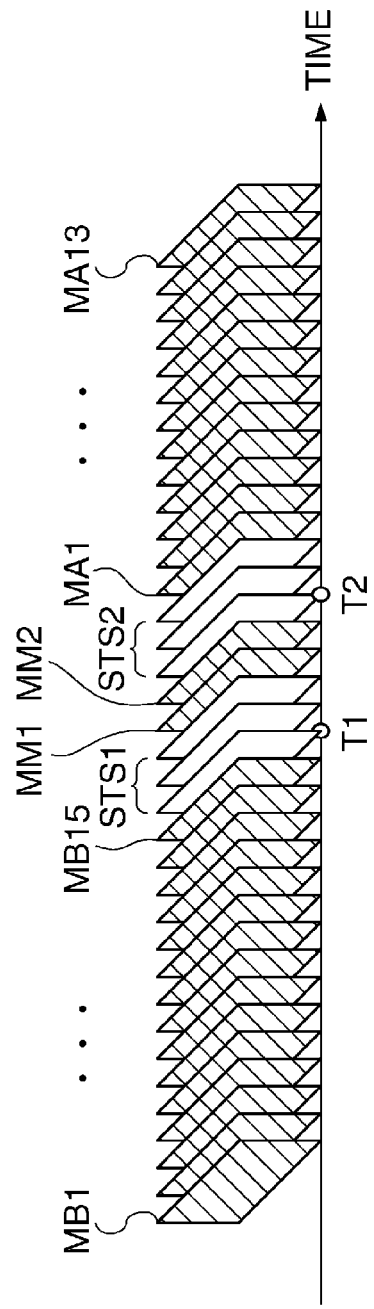

IMAGE PICKUP APPARATUS THAT SHOOTS MOVING IMAGE FOR PREDETERMINED TIME PERIOD AT THE TIME OF SHOOTING STILL IMAGE, CONTROL METHOD FOR THE IMAGE PICKUP APPARATUS, AND STORAGE MEDIUM

BACKGROUND OF THE INVENTION

Field of the Invention

The present invention relates to an image pickup apparatus such as a digital camera, and in particular to an image pickup apparatus that shoots a moving image for a predetermined time period before or after shooting a still image, a control method for the image pickup apparatus, and a storage medium.

Description of the Related Art

Some image pickup apparatuses such as digital camera shoot a moving image for a predetermined time period before and after shooting a still image.

For example, there has been proposed an image pickup apparatus which starts recording a moving image at first releasing by pressing a release button halfway down, shooting a still image at second releasing by pressing the release button all the way down, and finishes shooting the moving image upon lapse of a predetermined time period after shooting of the still image (Japanese Laid-Open Patent Publication (Kokai) No. 2001-78137).

The art described in Japanese Laid-Open Patent Publication (Kokai) No. 2001-78137 above has problems described hereafter. They will now be described with reference to FIG. 7. In FIG. 7, T1 designates a time at which a first shooting instruction is issued, and T2 designates a time at which a second shooting instruction is issued. MP1 designates a moving image shooting time period corresponding to a predetermined time period before and after T1, and MP2 designates a moving image shooting time period corresponding to a predetermined time period before and after T2.

As shown in FIG. 7, when both a moving image for a predetermined time period before and after shooting of a first still image (MP1) and a moving image for a predetermined time period before and after shooting of a second still image (MP2) are to be recorded, there is an overlapping time period, and hence the two moving images must be encoded in parallel at the same time.

In order to carry out a plurality of moving image encoding processes in parallel, a plurality of moving image encoders and a large-capacity memory for temporarily recording moving images including those for an overlapping moving image shooting timer period are necessary. This may cause an increase in the size of the image pickup apparatus and an increase in costs.

If a plurality of encoders and a large-capacity memory are not provided with an image pickup apparatus, a plurality of moving image encoding processes cannot be performed in parallel. In this case, it is conceivable that when a moving image encoding process is underway after shooting of a first still image, an instruction to shoot a second still image is not received. In this case, however, the chance of shooting in a predetermined time period after shooting of the first still image is missed.

SUMMARY OF THE INVENTION

The present invention provides an image pickup apparatus which shoots a moving image for a predetermined time period before or after shooting a still image and is capable of shooting a plurality of still images as instructed within a predetermined time period without the need to have a plurality of moving image encoders and a large-capacity memory, a control method for the image pickup apparatus, and a storage medium.

Accordingly, the present invention provides an image pickup apparatus comprising a receiving unit configured to receive a still image shooting instruction, an image pickup unit, and a control unit configured to control to record, in a recording medium, a still image picked up by the image pickup unit in response to a still image shooting instruction received by the receiving unit, and a moving image picked up before lapse of a predetermined time period after the still image shooting instruction, and when the receiving unit has received a second still image shooting instruction within the predetermined time period since the receiving unit received a first still image shooting instruction, control to record, in the recording medium, a moving image picked up before lapse of the predetermined time period after the second still image shooting instruction from a moving image shooting starting timing corresponding to the first still image shooting instruction as a sequence of moving images.

According to the present invention, the image pickup apparatus which shoots a moving image for a predetermined time period before or after shooting a still image is capable of shooting a plurality of still images as instructed within a predetermined time period without the need to have a plurality of moving image encoders and a large-capacity memory.

Further features of the present invention will become apparent from the following description of exemplary embodiments (with reference to the attached drawings).

BRIEF DESCRIPTION OF THE DRAWINGS

FIGS. 5A and 5B are schematic diagrams useful in explaining an exemplary still image temporary recording process in step S306 in FIG. 3.

DESCRIPTION OF THE EMBODIMENTS

Hereafter, an exemplary embodiment of the present invention will be described with reference to the drawings.

Figure 1:
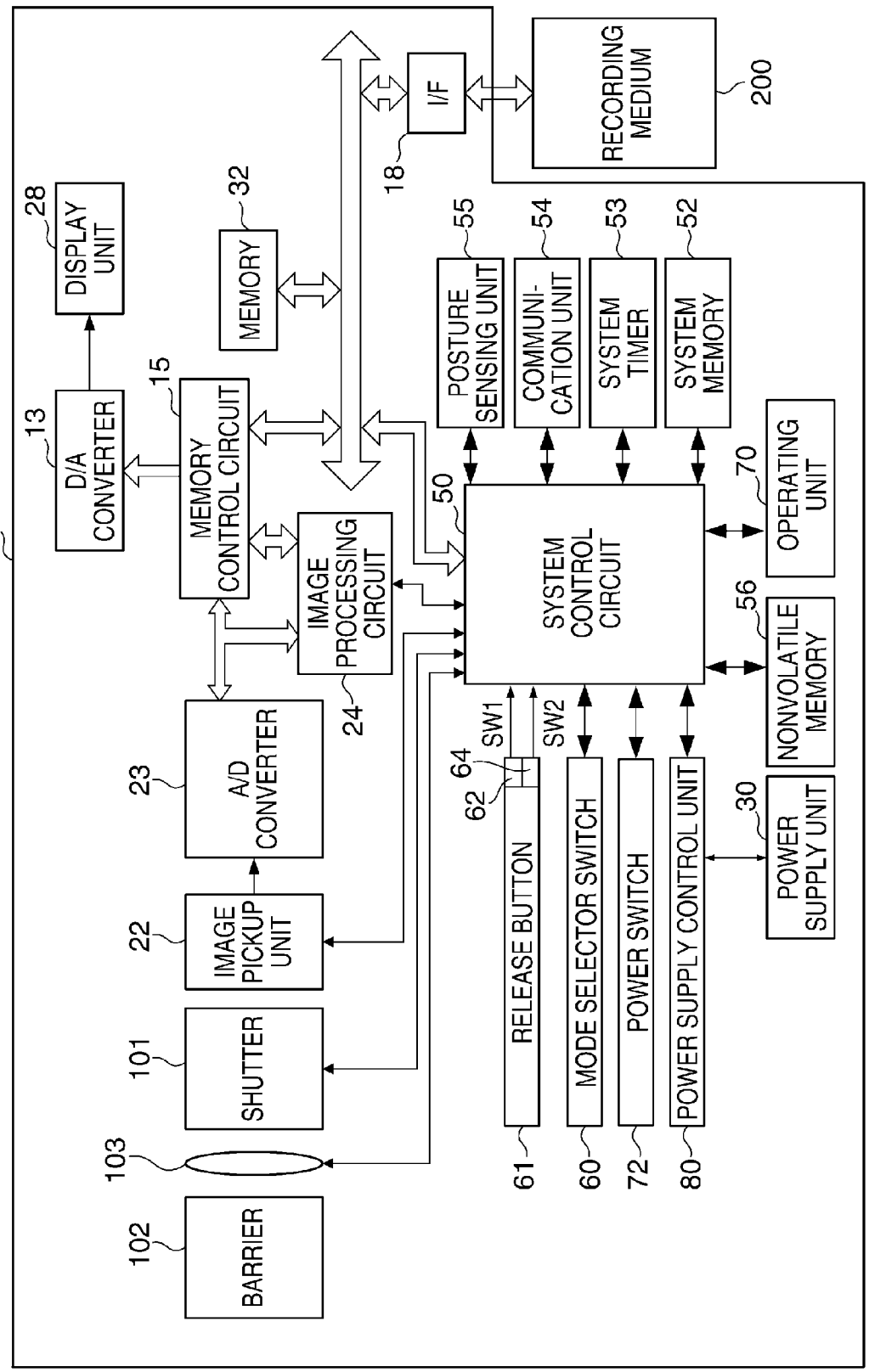
FIG. 1 is a block diagram showing an exemplary arrangement of a digital camera that is an exemplary embodiment of an image pickup apparatus according to the present invention.

FIG. 1 is a block diagram showing an exemplary arrangement of a digital camera that is an exemplary embodiment of an image pickup apparatus according to the present invention.

As shown in FIG. 1, the digital camera 100 according to the present embodiment has taking lenses 103 including a zoom lens, a focus lens, and so forth, and a shutter 101 having a diaphragm function, and a bundle of light rays from a subject passes through the taking lenses 103 and the shutter to form a subject image on an image pickup unit 22. The image pickup unit 22, which is comprised of an image pickup device such as a CCD sensor or a CMOS sensor, performs photoelectric conversion of the formed subject image and outputs an analog image signal obtained as a result to an A/D converter 23. The A/D converter 23 converts the analog image signal output from the image pickup unit 22 into a digital image signal. A barrier 102 covers an image pickup system including the taking lenses 103 to protect the taking lenses 103, the shutter 101, and the image pickup unit 22.

An image processing circuit 24 performs a variety of image processing on data from the A/D converter 23 or data from a memory control circuit 15. Data from the A/D converter 23 is written into a memory 32 through the image processing circuit 24 and the memory control circuit or through the memory control circuit 15. The memory 32, which corresponds to an exemplary storage of the present invention, stores image data converted into digital data by the A/D converter 23 and image data to be displayed on a display unit 28. The memory 32 has a recording capacity sufficient to store a predetermined number of still images and store moving images and sound for a predetermined time period. The memory 32 also has a memory for displaying images (video memory).

A D/A converter 13 converts image data for display stored in the memory 32 into an analog signal and supplies the analog signal to the display unit 28. As a result, the image data for display written in the memory 32 is displayed on the display unit 28 by way of the D/A converter 13. The display unit 28, which is comprised of an LCD or the like, displays an image corresponding to an analog image signal from the D/A converter 13. Once digital image signals have been obtained by A/D conversion by the A/D converter 32 and accumulated in the memory 32, they are converted into an analog signal by the D/A converter 13 and successively transferred to and displayed on the display unit 28, so that the display unit 28 acts as an electronic viewfinder and displays through-the-lens images.

A nonvolatile memory 56 is an electrically erasable programmable memory such as a ROM. Constants for operation of a system control circuit 50, programs, and so forth are recorded in the nonvolatile memory 56. The system control circuit 50 is responsible for controlling the overall digital camera 100. The system control circuit 50 also controls display by controlling the memory 32, the D/A converter 13, the display unit 28, and so forth. A RAM is used as a system memory 52. The system memory 52 expands constants for operation of the system control circuit 50, variables, programs read out from the nonvolatile memory 56, and so forth.

A system timer 53 is a time measurement unit that measures elapsed time for use in a variety of control and measures elapsed time on a built-in clock. A mode selector switch 60 switches the operating mode of the system control circuit 50 among a still image shooting mode, a moving image shooting mode, a reproducing mode, and so forth. Examples of modes included in the still image shooting mode are an auto shooting mode, an auto scene determination mode, a manual mode, various scene modes with shooting settings configured according to shooting scenes, a program AE mode, a still image-moving image shooting mode, and a custom mode. Here, in the still image-moving image shooting mode, a still image is shot in response to a shooting instruction, and moving images are shot for a predetermined time period before and after issuance of the shooting instruction. It should be noted that after the operating mode is switched once to the still image shooting mode using the mode selector switch 60, the operation mode may be switched to any of those modes included in the still image recording mode using another operating member. Likewise, a plurality of modes may be included in the moving image shooting mode as well.

A release button 61 (shutter button) is an operating member (receiving member) that receives a shooting instructing operation and a shooting preparation instructing operation from a user. A release switch (SW1) 62 is turned on in response to the release button 61 being pressed halfway down and instructs the system control circuit 50 to prepare for shooting. Based on an ON signal from the release switch (SW1) 62, the system control circuit 50 starts shooting preparations such as an AF (autofocus) process, an AE (auto exposure) process, an AWB (auto white balance) process, and an EF (pre-flash) process. A release switch (SW2) 64 is turned on in response to the release button 51 being pressed all the way down and instructs the system control circuit 50 to perform shooting. Based on an ON signal from the release switch (SW2) 64, the system control circuit 50 starts a sequence of shooting operations from readout of a signal from the image pickup unit 22 to writing of image data into a recording medium 200.

An operating unit 70 is caused to act as various function buttons by, for example, selecting a variety of function icons, which are displayed on the display unit 28, to appropriately assign functions to situations. Examples of the function buttons include an end button, a back button, an image feed button, a jump button, a narrow-down button, and an attribute change button. For example, when a menu button is depressed, a menu screen on which various setting can be configured is displayed on the display unit 28. A user is allowed to configure various settings through intuition using the menu screen displayed on the display unit 28, a four-way (up, down, right, and left) button, and a SET button.

A power switch 72 is for turning on and off the power to the digital camera 100. A power supply control unit 80 is comprised of a battery detection circuit, a DC-DC converter, a switch circuit that switches blocks to be energized, and so forth, and detects the presence or absence of a battery mounted, a type of a battery, and a remaining capacity of a battery. Also, based on a result of the detection and an instruction from the system control unit 50, the power supply control unit 80 controls the DC-DC converter and supplies required voltage to components including the recording medium 200 over a required time period.

A power supply unit 30 is comprised of a primary battery such as an alkali battery or a lithium battery, a secondary battery such as a NiCd battery, an NiMH battery, or an Li battery, an AC adapter, or the like. A recording medium I/F 18 is an interface to the recording medium 200 such as a memory card or a hard disk. The recording medium 200 is a recording medium such as a memory card for recording shot images and is comprised of a semiconductor memory, a magnetic disk, or the like.

A communication unit 54 is connected to external equipment by radio or a wired cable and sends and receives video signals and audio signals. The communication unit 54 is connectable to a wireless LAN (local area network) and the Internet. The communication unit 54 is capable of sending images picked up by the image pickup unit 22 (including through-the-lens images) and images recorded on the recording medium 200 to external equipment and also receiving image data and a variety of other information from external equipment.

A posture sensing unit 55 senses a posture of the digital camera 100 with respect to a direction of gravitational force. Based on a posture sensed by the posture sensing unit 55, it is possible to determine whether an image picked up by the image pickup unit 22 is an image obtained by holding the digital camera 100 in a landscape orientation or an image obtained by holding the digital camera 100 in a portrait orientation. The system control unit 50 is capable of adding orientation information corresponding to a posture sensed by the posture sensing unit 55 to an image file of an image picked up by the image pickup unit 22 and rotating and recording images. An acceleration sensor, a gyro sensor, or the like may be used as the posture sensing unit 55.

Figure 2:
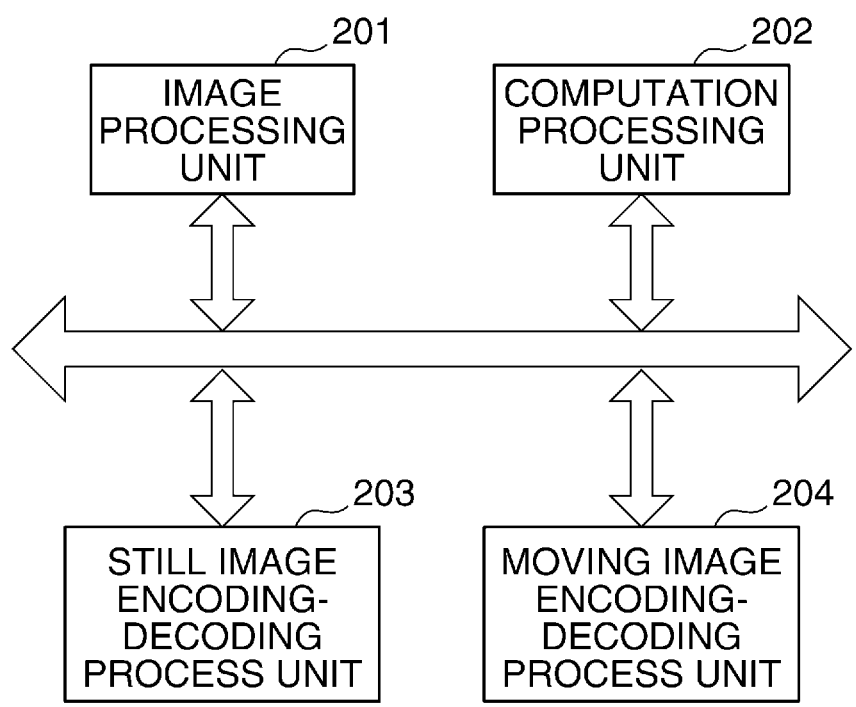
FIG. 2 is a block diagram showing an exemplary arrangement of an image processing circuit.

Referring next to FIG. 2, a detailed description will be given of the image processing circuit 24. FIG. 2 is a block diagram showing an exemplary arrangement of the image processing circuit 24.

Referring to FIG. 2, an image processing unit 201 carries out a resizing process such as predetermined pixel interpolation and reduction, a color conversion process, and so forth. A computation process unit 202 carries out a predetermined computation process using image data obtained by image pickup, and based on a result of the computation, the system control unit 50 controls light exposure and distance measurement. As a result, a TTL (through-the-lens) AF (autofocus) process, an AE (auto exposure) process, and an EF (pre-flash) process are carried out. The computation process unit 202 also carries out a TTL AWB (auto white balance) process based on an obtained computation result.

Still image data is input to a still image encoding-decoding process unit 203, which in turn carries out an encoding process and generates thumbnails. An encoding scheme is, for example, JPEG. Encoded still image data is recorded as a still image on the recording medium 200 via the recording medium I/F 18. The still image encoding-decoding process unit 203 reads out thumbnail images and real images, which are recorded on the recording medium 200, via the recording medium I/F 18 and the memory control circuit 15 to carry out a decoding process.

A plurality of pieces of moving image frame data is input to a moving image encoding-decoding process unit 204, which in turn carries out an encoding process. An encoding scheme is, for example, MPEG4 part-10: AVC (ISO/IEC 14496-10 sometime called H. 264). A plurality of pieces of encoded moving image data is recorded as a moving image on the recording medium 200 via the recording medium I/F 18. The moving image encoding-decoding process unit 204 reads out the moving image, which is recorded on the recording medium 200, via the recording medium I/F 18 and the memory control circuit 15 to carry out a decoding process.

Figure 3:
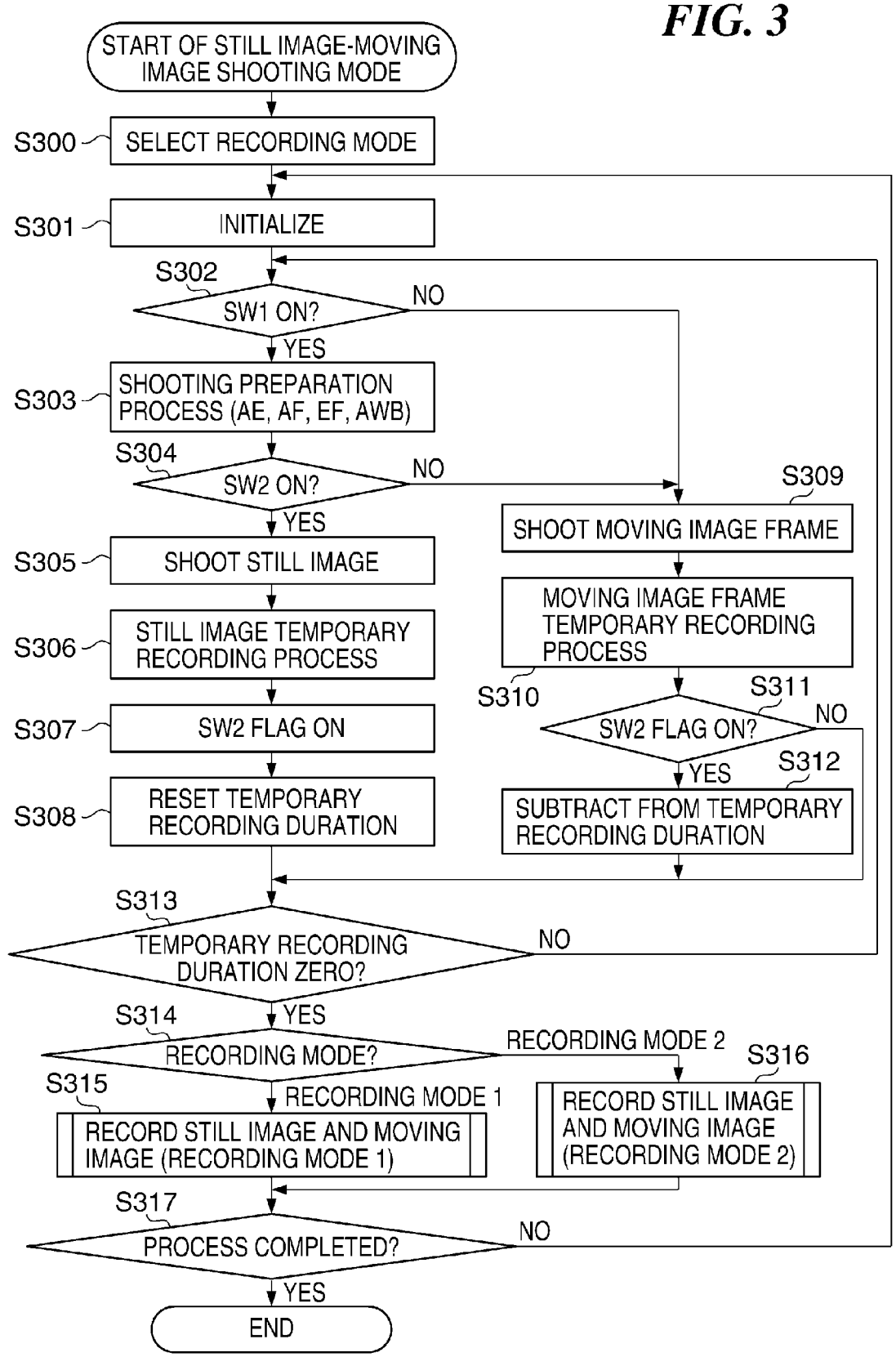
FIG. 3 is a flowchart useful in explaining a process in a still image-moving image shooting mode.

Referring next to FIG. 3, a description will be given of the flow of a process in the still image-moving image shooting mode. It should be noted that processes in FIG. 3 are carried out by a CPU or the like of the system control circuit 50 in accordance with programs that are stored in the nonvolatile memory 56 and expanded into the system memory 52.

Referring to FIG. 3, in step S300, when the still image-moving image shooting mode is selected, the system control circuit 50 selects a recording mode 1 or a recording mode 2 according to an input from the operating unit 70, and the process proceeds to step S301.

Here, the recording mode 1 is a shooting mode in which, for each of a plurality of shot still images, one still image and one moving image shot within a predetermined time period before and after shooting of the still image are recorded. The recording mode 2 is a shooting mode in which, for a single moving image continuously shot in a sequence, a plurality of still images shot while the moving image is being shot is recorded. It should be noted that in the present embodiment, shooting modes other than the recording mode 1 and the recording mode 2 are allowed to be selected, but here, only the recording mode 1 and the recording mode 2 are described for the simplification of explanation.

In the step S301, the system control circuit 50 initializes a duration of temporary recording and an SW2 flag, and the process proceeds to step S302. Here, the duration of temporary recording is a duration over which temporary recording of a moving image is continued, and for example, when a moving image for three seconds before and after shooting of a still image is to be recorded, the duration of temporary recording is set to three seconds. The number of moving image frames or the like may be set as similar information. Moreover, as the duration of temporary recording, a time period determined in advance with respect to each recoding mode may be read out from the nonvolatile memory and set, or a time period selected or specified through user operation may be set. The SW2 flag is a flag for maintaining an ON state from when the release switch (SW2) 64 is turned on to when a sequence of recording processes is completed. The SW2 flag is set to OFF at default.

In the step S302, the system control circuit 50 judges whether or not the release switch (SW1) 62 has been turned on by, for example, pressing the release button 61 halfway down, and when the system control circuit 50 judges that the release switch (SW1) 62 has been turned on, the process proceeds to step S303. When the system control circuit 50 judges that the release switch (SW1) 62 is off, the process proceeds to step S309.

It should be noted that immediately after the initialization in the step S301, it is assumed that the release button 61 has not been pressed halfway down in most cases, and in such cases, the process proceeds to the step S309, in which a moving image before shooting of a still image is shot and temporarily recorded in the memory 32. On the other hand, when not immediately after the initialization in the step S301, there is a possibility that a still image was shot in step S305, to be described later, but in either case, when the release switch (SW1) 62 is off, the process proceeds to the step S309, to be described later, in which a moving image is shot and temporarily recorded in the memory 32.

In the step S303, the system control circuit 50 carries out a shooting preparation process required to shoot a still image and a moving image, and the process proceeds to step S304. Specifically, the system control circuit 50 controls the shutter 101, the taking lenses 103, the image pickup unit 22, and the image processing circuit 24 to carry out an AE process, an AF process, an EF process, an AW process, and so on.

In the step S304, the system control circuit 50 judges whether or not the release switch (SW2) 64 has been turned on by, for example, pressing the release button 61 all the way down, and when the system control circuit 50 judges that the release switch (SW2) 64 has been turned on, the process proceeds to step S305. When the system control circuit 50 judges that the release switch (SW2) 64 is off, the process proceeds to the step S309.

In the step S305, the system control circuit 50 shoots a still image using the image pickup unit 22, and the process proceeds to step S306. Specifically, the system control circuit 50 performs light exposure (image pickup) at an f-number, a shutter speed, and a sensitivity, which have been set so as to shoot a still image, using the image pickup unit 22 and converts an image signal obtained as a result into still image data using the A/D converter 23.

It should be noted that, in shooting of a still image, the number of pixels is larger than that in one frame of a moving image, depending on a set number of pixels to be recorded, and in many cases, the processing time is longer than that of a shooting process for one frame of a moving image due to an f-number, a shutter speed, a sensitivity, and image processing.

In the step S306, the system control circuit 50 subjects still image data output from the A/D converter 23 to a variety of processing using the image processing circuit 24. The system control circuit 50 then temporarily records the still image data (image data for a still image file) and determination information for the still image data in the memory 32, and the process proceeds to step S307. Here, the determination information is, for example, a time at which a still image was shot, and obtained from the system timer 53. After carrying out a resizing process to resize the still image data to the same size as a moving image recording size, the system control circuit 50 temporarily records moving image frame data at a time at which an instruction to shoot a moving image was issued as determination information in the memory 32.

It should be noted that in the resizing process, when there is a difference in aspect ratio between a moving image and a still image, a trimming process as well is carried out. The determination information, which is temporarily recorded in the memory 32, is for a plurality of frames in a time period to shooting of a moving image in the step S309, to be described later.

In the step 307, the system control circuit 50 turns on the SW2 flag, and the process proceeds to step S308. Here, as described earlier, the SW2 flag is kept on from when the release switch (SW2) 64 is turned on to when a sequential recording process is completed. The SW2 flag being on indicates that a predetermined time period or less has elapsed after a last still image was shot. On the other hand, the SW2 flag being off indicates that no still image has been shot since starting of the digital camera 100, or even when a still image has been shot since starting of the digital camera 100, a time period longer than the predetermined time period has elapsed.

In the step 308, the system control circuit 50 resets a duration of temporary recording, and the process proceeds to step S313. For example, when a moving image for three seconds before and after shooting of a still image is to be recorded, the duration of temporary recording is set to three seconds. As a result, elapsed time is measured to determine whether or not a predetermined time period has elapsed since shooting of the still image in the step S305.

On the other hand, in the step 309, the system control circuit 50 shoots a moving image using the image pickup unit 22 and converts an image signal obtained from the image pickup unit 22 into moving image frame data using the A/D converter 23, followed by the process proceeding to step S310. The conversion process here is to obtain frame images of the moving image for a moving image file and carried out based on an aspect ratio for a moving image, exposure, the number of pixels, and image processing conditions.

In the step 310, the system control circuit 50 subjects the moving image frame data obtained in the step S309 to a variety of processing using the image processing circuit 24 and temporarily records the moving image frame data and determination information for the moving image frame data in the memory 32, followed by the process proceeding to step S311.

Through the processes in the steps S309 and S310, frame data on a moving image is accumulated in the memory 32 over a time period for which no still image is shot. It should be noted that it is only necessary to obtain frame data on a moving image for a predetermined time period before and after shooting of a still image, and hence frame data that precedes frame data of twice as long as the predetermined time period (corresponding to time periods before and after shooting of a still image) may be discarded successively.

In the step 311, the system control circuit 50 judges whether or not the SW2 flag is on. When the system control circuit 50 judges that the SW2 flag is on, the process proceeds to step S312, and when the system control circuit 50 judges that the SW2 flag is off, the process proceeds to step S313.

In the step 312, the system control circuit 50 performs subtraction for the duration of temporary recording, and the process proceeds to the step S313. A value subtracted here corresponds to one frame of a moving image according to the duration of temporary recording initialized in the step S301. For example, when the duration of temporary recording is set to 3 seconds in the step S301, and a frame rate of a moving image to be shot is 60 FPS, 0.016 second is subtracted from 3 seconds. The process in the step S312 is intended to determine whether or not the predetermined time period has elapsed since shooting of the still image.

In the step 313, the system control circuit 50 judges whether or not the duration of temporary recording is zero. When the system control circuit 50 judges that the duration of temporary recording is zero, the process proceeds to step S314, and when the system control circuit 50 judges that the duration of temporary recording is not zero, the process returns to the step S302, in which the sequence of processes is carried out again. The duration of temporary recording being zero indicates that the predetermined time period has elapsed since shooting of the still image.

In the step 314, the system control circuit 50 judges whether the recording mode selected in the step S300 is the recording mode 1 or the recording mode 2. When the selected recording mode is the recording mode 1, the process proceeds to step S315, and when the selected recording mode is the recording mode 2, the process proceeds to step S316. In the step 315, the system control circuit 50 carries out a process in the recording mode 1 using the image processing circuit 24, and the process proceeds to step S317.

In the step 316, the system control circuit 50 carries out a process in the recording mode 2 using the image processing circuit 24, and the process proceeds to the step S317. It should be noted that the processes in the recording mode 1 and the recording mode 2 will be described later. In the step 317, the system control circuit 50 judges whether or not a terminating instruction has been issued through the operating unit 70. When the system control circuit 50 judges that a terminating instruction has been issued, the process is terminated, and when the system control circuit 50 judges that no terminating instruction has been issued, the process returns to the step S301, in which the sequence of processes is carried out again. It should be noted that when the process returns to the step S301, the SW2 flag is initialized to off.

Figure 4A:
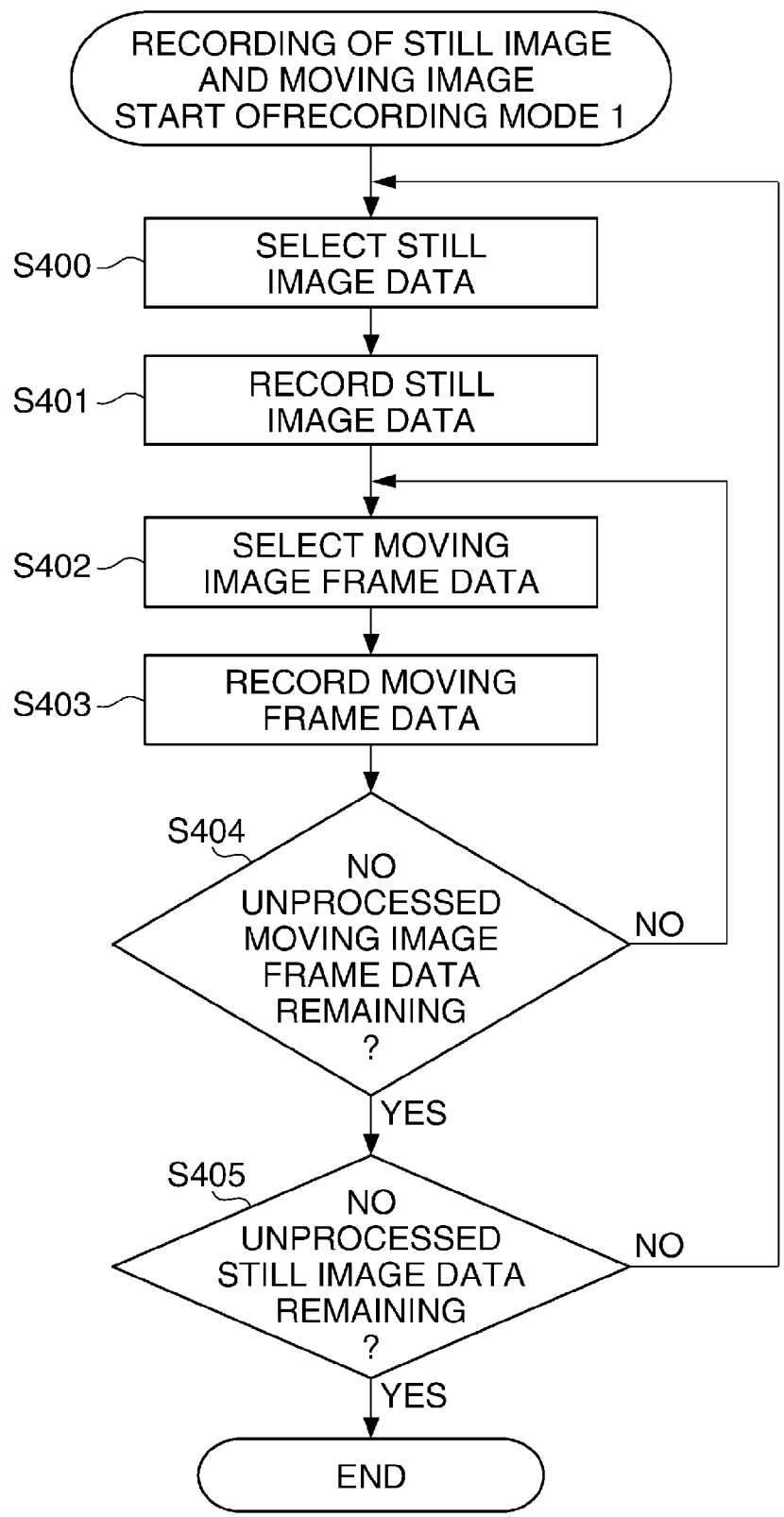
FIG. 4A is a flowchart showing the procedure of a process in a recording mode 1 in step S315 in FIG. 3.
Figure 4B:
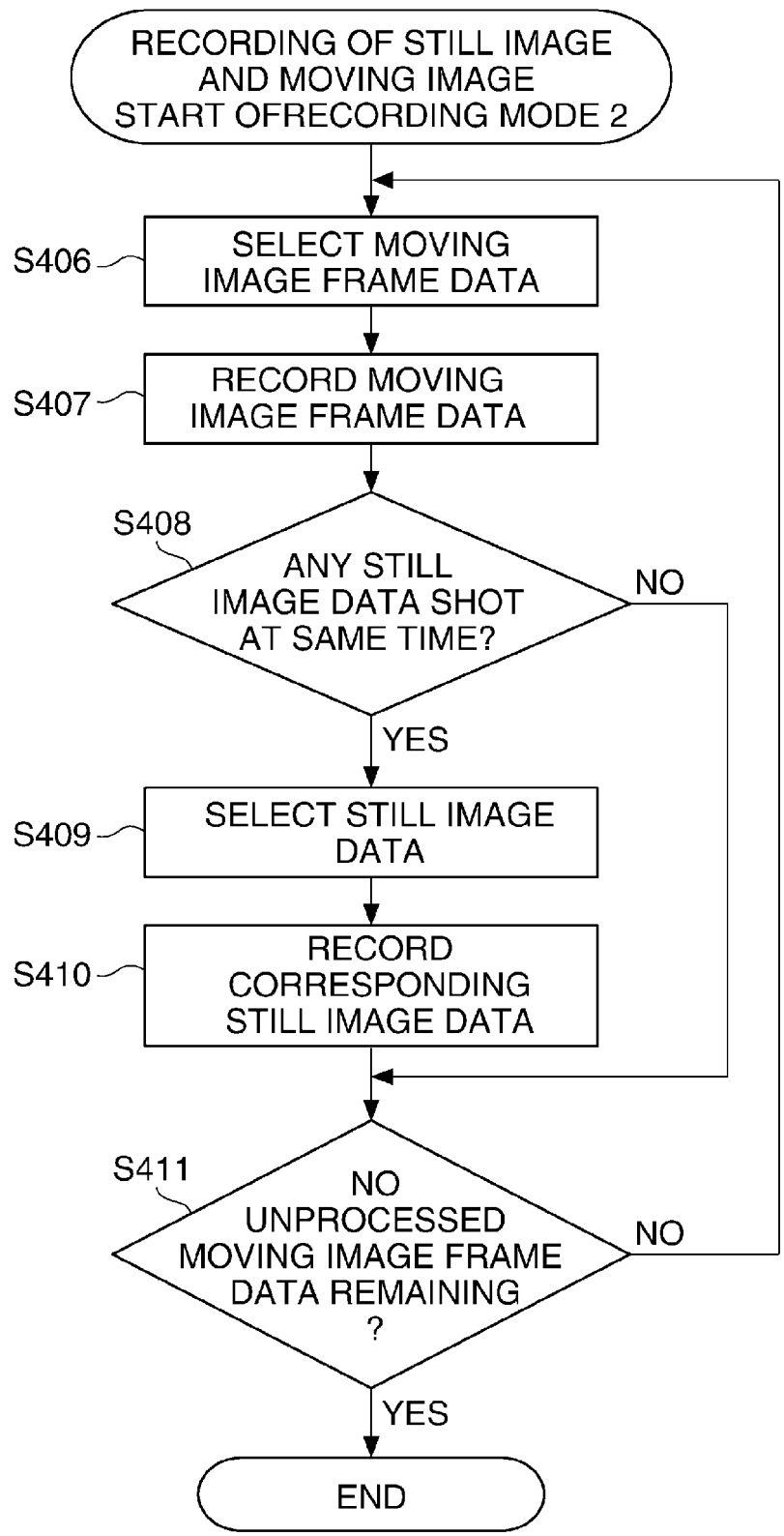
FIG. 4B is a flowchart showing the procedure of a process in a recording mode 2 in step S316 in FIG. 3.

Referring next to FIGS. 4A and 4B, a detailed description will be given of the processes in the recording mode 1 and the recording mode 2. FIG. 4A is a flowchart showing the procedure of the process in the recording mode 1 in the step S315 in FIG. 3. FIG. 4B is a flowchart showing the procedure of the process in the recording mode 2 in the step S316 in FIG. 3.

Referring first to FIG. 4A, a description will be given of the recording mode 1. As shown in FIG. 4A, a plurality of pieces of still image data temporarily recorded in the memory 32 in response to a plurality of shooting instructions from the release switch (SW2) 64 is successively selected and processed. First, in step S400, the system control circuit 50 selects a piece of unprocessed still image data from among a plurality of pieces of still image data temporarily recorded in the memory 32 in response to a plurality of shooting instructions from the release switch (SW2) 64, and the process proceeds to step S401.

In the step 401, the system control circuit 50 subjects the still image data, which was selected in the step S400, to an encoding process using the still image encoding-decoding process unit 203 of the image processing circuit 24 and records the still image data as a still image file in the recording medium 200, followed by the process proceeding to step S402.

In the step 402, the system control circuit 50 selects moving image frame data, which was shot within a predetermined time period before and after a time at which the still image data selected in the step S400 was shot, from moving frame data temporarily recorded in the memory 32, and the process proceeds to step S403. It should be noted that times at which still image data and moving frame data are shot are determined by the system control unit 50 based on determination information temporarily recorded in the memory 32 in the step S306 and the step S310.

In the step 403, the system control circuit 50 subjects the moving image frame data, which was selected in the step S402, to an encoding process using the moving image encoding-decoding process unit 204 of the image processing circuit 24 and records the moving image frame data as part of a moving image in the recording medium 200, followed by the process proceeding to step S404.

In the step 404, the system control circuit 50 judges whether or not the moving image frame data shot within the predetermined time period before and after the time at which the still image data selected in the step S400 was shot is still remaining. When the system control circuit 50 judges that the moving frame data is still remaining, the process returns to the step S402, in which the system control circuit 50 in turn performs the sequence of processes again, and when the system control circuit 50 judges that the moving frame data is not remaining, the process proceeds to the step S405. As a result, the moving frame data for the time period corresponding to one still image selected in the step S400 is clipped from the overall moving image frame data temporarily recorded in the memory 32 and recorded as one moving image file.

In the step 405, the system control circuit 50 judges whether or not the still image frame data temporarily recorded in the memory 32 is still remaining. Upon judging that the still image data is not remaining, the system control circuit 50 terminates the process, and when the system control circuit 50 judges that the still image data is still remaining, the process returns to the step S400, in which the system control circuit 50 in turn performs the sequence of processes again.

As a result of the process in FIG. 4A, for each of a plurality of still images that has been shot, one still image and one moving image shot within a predetermined period before and after shooting of the still image are recorded. Namely, in the recording mode 1, a plurality of moving image files comprised of pictures for time periods corresponding to respective ones of a plurality of still image files is generated and recorded.

Referring next to FIG. 4B, a description will be given of the recording mode 2. As shown in FIG. 4B, in step S406, the system control circuit 50 selects a piece of moving frame data from a plurality of pieces of moving frame data temporarily recorded in the memory 32, and the process proceeds to step S407.

In the step 407, the system control circuit 50 subjects the moving image frame data, which was selected in the step S406, to an encoding process using the moving image encoding-decoding process unit 204 of the image processing circuit 24. After subjecting the moving image frame data to the encoding process, the system control circuit 50 records the encoded moving image frame data as a frame of one moving image file in the recording medium 200, followed by the process proceeding to step S408.

In the step S408, the system control circuit 50 judges whether or not there is any still image data shot at substantially the same time when the moving image frame data selected in the step S406 was shot. To be exact, a still image and a moving image are not shot at the same time since no moving image can be shot during a time period for which a still image is being shot (S305 to S308), but data that can be judged as still image data that follows a moving image shot immediately before shooting of a still image is regarded as still image data shot at the same time when the moving image was shot. The times at which still image data and moving frame data are shot are determined by the system control unit 50 based on determination information temporarily recorded in the memory 32 in the step S306 and the step S310. When the system control circuit 50 judges that there is still image data shot at substantially the same time when the moving image frame data was shot, the process proceeds to step S409, and when the system control circuit 50 judges that there is no still image data shot at substantially the same time when the moving image frame data was shot, the process proceeds to step S411.

In the step 409, the system control circuit 50 selects still image data shot at substantially the same time when the moving image frame data selected in the step S406 was shot, and the process proceeds to step S410. In the step 410, the system control circuit 50 subjects the still image data, which was selected in the step S409, to an encoding process using the still image encoding-decoding process unit 204 of the image processing circuit 24 and records the encoded still image data as a still image in the recording medium 200, followed by the process proceeding to step S411. In the step S411, the system control circuit 50 judges whether or not there is any unprocessed moving image frame data. Upon judging that unprocessed moving image frame data is remaining, the system control circuit 50 terminates the process, and when the system control circuit 50 judges that no unprocessed moving image frame data is remaining, the process returns to the step S406, in which the system control circuit 50 in turn performs the sequence of processes again.

By repeatedly carrying out the process in FIG. 4B, moving image frame data temporarily recorded in the memory 32 is successively joined together to generate one moving image. Through the processes described above, one moving image and a plurality of still images shot within a time period for which the moving image is shot are recorded. Namely, in the recording mode 2, one moving file comprised of pictures for time periods corresponding to all of a plurality of still image files is generated and recorded.

Referring next to FIGS. 5A and 5B, a description will be given of an exemplary still image temporarily recording process in the step S306 in FIG. 3.

FIG. 5A is a diagram schematically showing a state of still image data temporarily recorded in the memory 32. In FIG. 5A, T1 and T2 each designate a time at which a shooting instruction is input, and ST1 and ST2 designate still image data temporarily recorded in the memory 32 at the times T1 and T2, respectively.

FIG. 5B is a diagram schematically showing a state of moving image frame data temporarily recorded in the memory 32. In FIG. 5B, STS1 and STS2 designate still image data subjected to a predetermined process such as a resizing process at the times ST1 and ST2 and temporarily recorded as moving image frames in the memory 32. Here, when a processing time period required in the still image shooting mode is longer than that in the moving image shooting mode, STS1 may be temporarily recorded as moving image frames in the memory 32 over a plurality of frames.

MM1 and MM2 designate moving image frame data shot in the period from the time T1 to the time T2. MB1 to MB15 designate moving image frame data shot in a predetermined time period before the time T1, and MA1 to MA13 designate moving image frame data shot in a predetermined time period after the time T2.

Figure 6A:
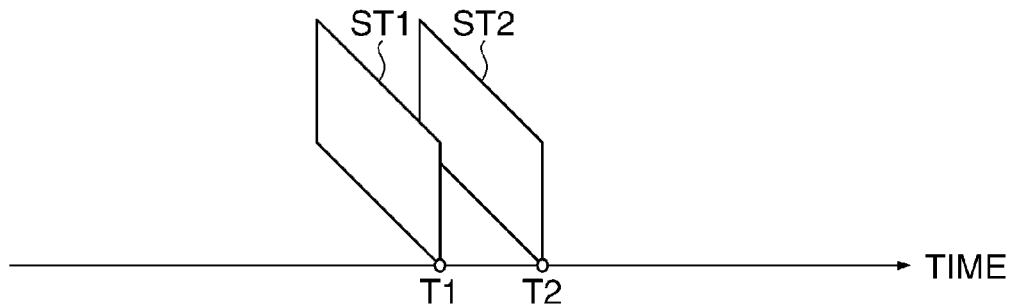
FIGS. 6A to 6C are schematic diagrams useful in explaining how still image data and moving image frame data are recorded in the recording mode 1 and the recording mode 2.
Figure 6B:
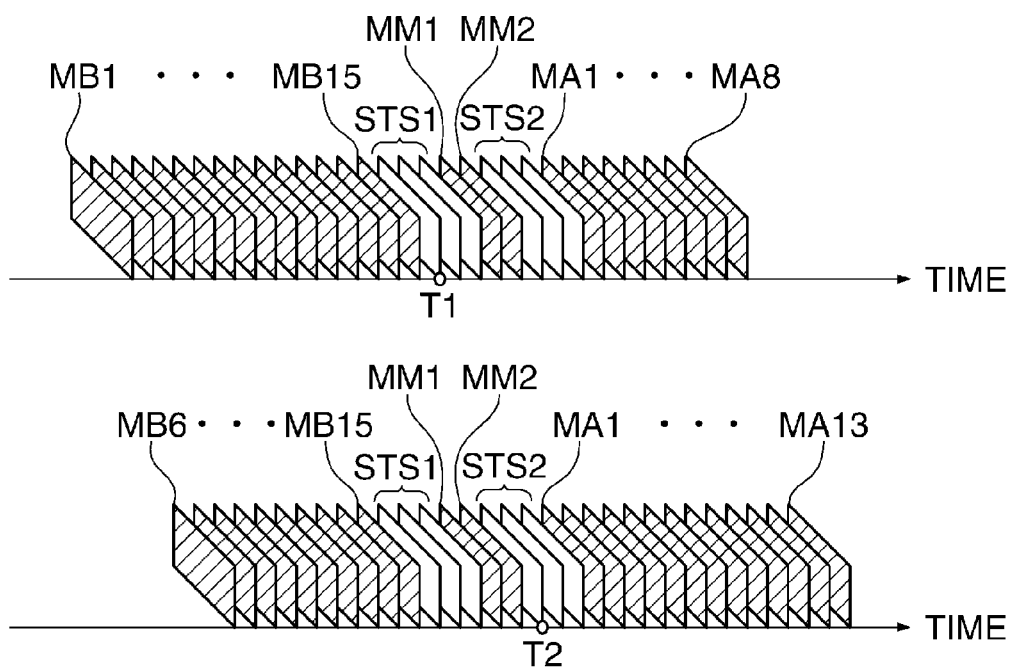
Figure 6C:
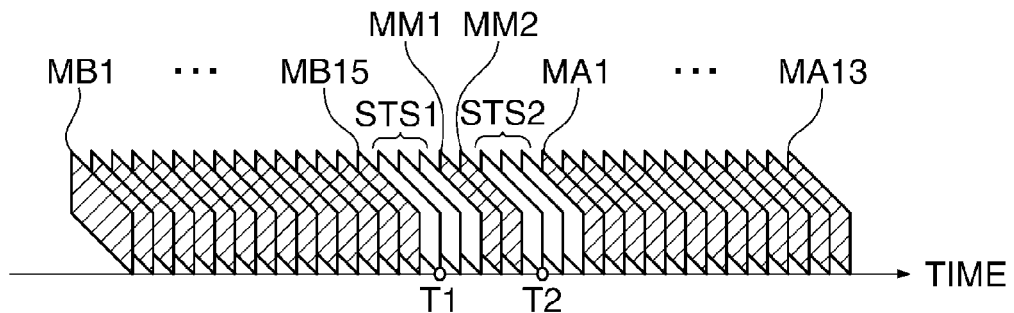
Figure 7:
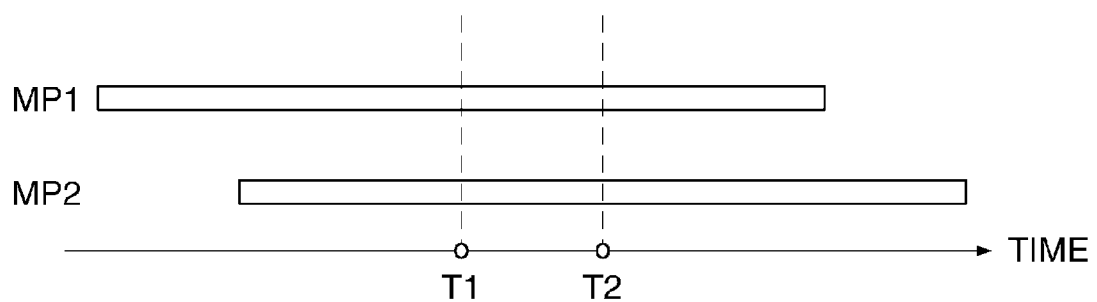
FIG. 7 is a schematic diagram useful in explaining problems of a prior art.

Referring next to FIGS. 6A to 6C, a description will be given of a process in which still image data and moving frame data are recorded in the recording mode 1 in the step S315 in FIG. 3 and the recording mode 2 in the step S316 in FIG. 3. It should be noted that in FIGS. 6A to 6C, states of temporarily recorded data correspond to those in FIGS. 5A and 5B, and the same reference symbols as those in FIGS. 5A and 5B are used.

FIG. 6A is a schematic diagram showing how still image data is recorded in the recording mode 1 and the recording mode 2. As shown in FIG. 6A, temporarily recorded still image data is subjected to a predetermined process and recorded as a plurality of still images.

FIG. 6B is a schematic diagram showing how moving images are recorded in the recording mode 1. In the recording mode 1, for a piece of still image data, a moving image for a predetermined time period before and after shooting of the still image data are recorded. For ST1, moving image frame data MB1 to MA8 shot in a predetermined time period before and after the time T1 (MB1 to MB15, STS1, MM1, MM2, STS2, MA1 to MA8) is recorded as one moving image. For ST2, moving image frame data MB6 to MB13 shot in a predetermined time period before and after the time T2 (MB6 to MB15, STS1, MM1, MM2, STS2, MA1 to MA13) is recorded as one moving image.

FIG. 6C is a schematic diagram showing how a moving image is recorded in the recording mode 2. In the recording mode 2, temporarily recorded moving image frame data is recorded as it is as one moving image. Specifically, one moving image (moving image file) comprised of MB1 to MB15, STS1, MM1, MM2, STS2, MA1 to MA13) is recorded as a moving image corresponding to both ST1 and ST2.

As described above, in the present embodiment, a moving image in a predetermined time period before and after first shooting of a still image and a moving image in a predetermined time period before and after second shooting of a still image are recorded as one moving image in the memory 32. Thus, a moving image in a predetermined time period before and after first shooting of a still image and a moving image in a predetermined time period before and after second shooting of a still image are processed using a single encoder. This dispenses with a plurality of moving image encoders for carrying out a plurality of moving image encoding processes in parallel and a large-capacity memory for temporarily recording moving images shot in overlapping moving image shooting time periods unlike the conventional arts.

Moreover, in the present embodiment, the digital camera 100, which shoots moving images for a predetermined time period before and after shooting a still image, is capable of shooting a plurality of still images as instructed within a predetermined time period without the need to have a plurality of moving image encoders and a large-capacity memory.

It should be noted that although in the embodiment described above, the encoding process is carried out in the step S315 and the step S316 after temporary recording of a plurality of pieces of moving image frame data is entirely completed in the processes from the step S302 to the step S311 in FIG. 3, the encoding process should not necessarily be limited to this. Temporary recording and encoding of still image data and moving image frame data may be performed in parallel to the extent possible.

Moreover, although in the embodiment described above, moving images are recorded for the same time period before and after shooting of a still image, recording time periods before and after shooting of a still image should not always be the same. For example, moving images for two seconds before and three seconds after shooting of a still image may be recorded.

Further, although in the above description of the embodiment, the case where moving image for a predetermined number of seconds before and after shooting of a still image are recorded is illustrated, only a moving image for a predetermined number of seconds after shooting of a still image may be recorded without recording a moving image before shooting of the still image. Namely, the present invention may be applied even to a case where an instruction to shoot a second still image is issued within a predetermined number of seconds after a first still image is shot. In this case, when the judgment result is negative (NO) in the step S302 in FIG. 3, it is judged whether or not the SW2 flag is on. When it is judged that the SW2 flag is on, the process should proceed to the step S309, and when it is judged that the SW2 flag is off, the process should proceed to the step S317.

Further, although in the embodiment described above, the image pickup apparatus according to the present invention is applied to a digital camera, the image pickup apparatus according to the present invention may be applied to smart phones and other mobile terminals as long as they have a function of shooting a moving image for a predetermined time period at least after shooting a still image.

Specifically, the present invention may be applied to a personal computer, a PDA, a cellular phone unit, a mobile image viewer, a printer device with a display, a digital photo frame, a music player, a game machine, an electronic book reader, and so forth. The present invention may also be applied to a case where a shooting instruction is received as a command from an external apparatus that is remotely controlled.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-119066, filed Jun. 12, 2015 which is hereby incorporated by reference herein in its entirety.

What is claimed is:

1. An image pickup apparatus comprising:
   an image pickup unit;
   one or more processors; and
   at least one memory storing instructions which, when executed by the one or more processors, cause the image pickup apparatus to:
      receive a first still image shooting instruction,
      control to record, in a recording medium, a still image picked up by the image pickup unit in response to receiving the first still image shooting instruction, and a moving image picked up by the image pickup unit since a predetermined time period before receiving the first still image shooting instruction, and
      when a second still image shooting instruction is received within a predetermined time period since receiving the first still image shooting instruction, control to record, in the recording medium, a moving image, picked up since the predetermined time period before receiving the first still image shooting instruction until a moving image shooting ending time corresponding to the second still image shooting instruction being received, as a sequence of moving images.

2. The image pickup apparatus according to claim 1, wherein the instructions, when executed by the one or more processors, further cause the image pickup apparatus to control to record, in the recording medium, moving images corresponding to respective ones of a plurality of still image shooting instructions, in one moving image file.

3. The image pickup apparatus according to claim 1, wherein, when the second still image shooting instruction is received within the predetermined time period since receiving the first still image shooting instruction, the instructions, when executed by the one or more processors, further cause the image pickup apparatus to control to record, in the recording medium, the moving image, picked up since the predetermined time period before the first still image shooting instruction is received until the moving image shooting ending time corresponding to the second still image shooting instruction being received, in one moving image file.

4. The image pickup apparatus according to claim 1,
   wherein the image pickup apparatus has a first recording mode and a second recording mode,
   wherein, when the second still image shooting instruction is received within the predetermined time period since receiving the first still image shooting instruction in the first recording mode, the instructions, when executed by the processor, further cause the image pickup apparatus to control to record, in the recording medium, a first moving image, picked up since the predetermined time period before the first still image shooting instruction is received until a moving image shooting ending time corresponding to the first still image shooting instruction being received, and a second moving image, picked up since the predetermined time period before the second still image shooting instruction is received until the moving image shooting ending time corresponding to the second still image shooting instruction being received, in different moving image files, and
   wherein, when the second still image shooting instruction is received within the predetermined time period since receiving the first still image shooting instruction in the second recording mode, the instructions, when executed by the one or more processors, further cause the image pickup apparatus to record, in the recording medium, a moving image, picked up since the predetermined time period before the first still image shooting instruction is received until a moving image shooting ending time corresponding to the second still image shooting instruction being received, in one moving image file.

5. The image pickup apparatus according to claim 4, further comprising a temporal recording memory configured to temporarily record a moving image picked up by the image pickup unit,
   wherein, when the second still image shooting instruction is received within the predetermined time period since receiving the first still image shooting instruction in the first recording mode, the instructions, when executed by the one or more processors, further cause the image pickup apparatus to:
      control to select the first moving image and the second moving image, picked up in a term corresponding to the second still image shooting instruction, from moving images recorded in the temporal recording memory, and
      record the first moving image and the second moving image in the recording medium as different moving image files.

6. The image pickup apparatus according to claim 5, wherein the first moving image and the second moving image include a moving image picked up in the same time period.

7. An image pickup method comprising:
   receiving a first still image shooting instruction;
   controlling to record, in a recording medium, a still image picked up by an image pickup unit in response to receiving the first still image shooting instruction, and a moving image picked up by the image pickup unit since a predetermined time period before the first still image shooting instruction is received; and when a second still image shooting instruction is received within a predetermined time period since receiving the first still image shooting instruction, controlling to record, in the recording medium, a moving image, picked up since the predetermined time period before the first still image shooting instruction is received until a moving image shooting ending time corresponding to the second still image shooting instruction being received, as a sequence of moving images.

8. A non-transitory computer-readable storage medium storing instructions which, when executed by a processor, cause an image pickup apparatus to:

receive a first still image shooting instruction;

control to record, in a recording medium, a still image picked up by an image pickup unit in response to the first still image shooting instruction, and a moving image picked up by the image pickup unit since a predetermined time period before the first still image shooting instruction is received; and when a second still image shooting instruction is received within a predetermined time period since receiving the first still image shooting instruction, controlling to record, in the recording medium, a moving image, picked up since the predetermined time period before the first still image shooting instruction is received until a moving image shooting ending time corresponding to the second still image shooting instruction being received, as a sequence of moving images.

\* \* \* \* \*